Apr. 24, 1923.  
R. JARDINE  
APPARATUS FOR MAKING MOTOR VALVES  
Filed Dec. 20, 1920    5 Sheets-Sheet 3  
1,452,510
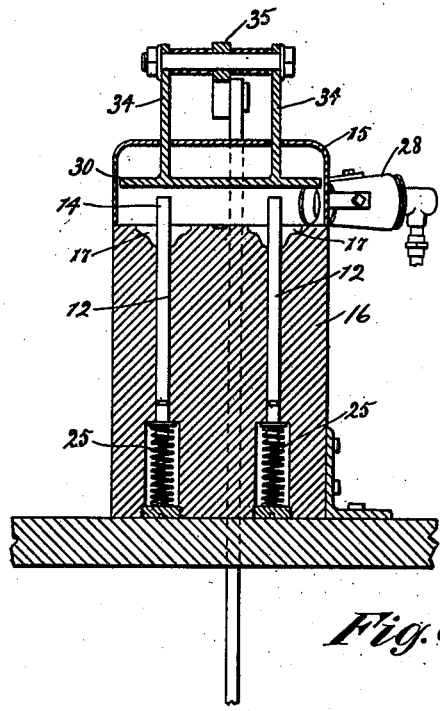
*Fig. 3.*
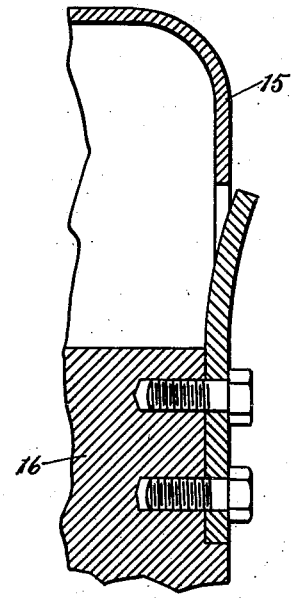
*Fig. 4.*
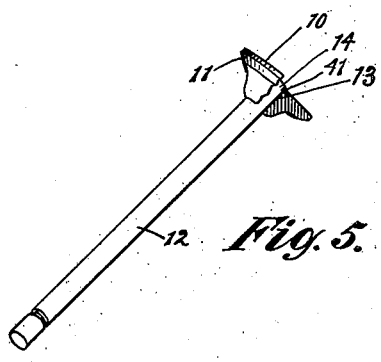
*Fig. 5.*
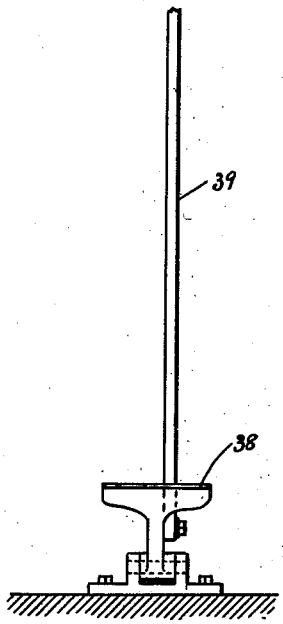
Inventor:  
Robert Jardine  
By Gillson & Gillson Attys

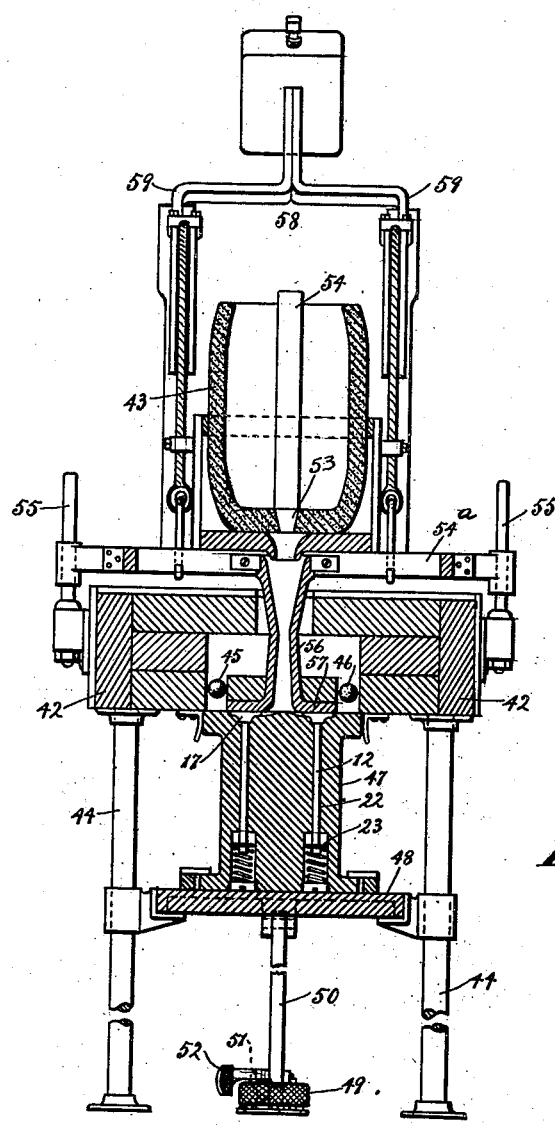

Apr. 24, 1923.

R. JARDINE 1,452,510

APPARATUS FOR MAKING MOTOR VALVES

Filed Dec. 20, 1920

Inventor:
Robert Jardine
By Gillson & Gillson
Attys.

Patented Apr. 24, 1923.

1,452,510

UNITED STATES PATENT OFFICE.

ROBERT JARDINE, OF CHICAGO, ILLINOIS, ASSIGNOR TO RICH TOOL COMPANY, OF CHICAGO, ILLINOIS, A CORPORATION OF ILLINOIS.

APPARATUS FOR MAKING MOTOR VALVES.

Application filed December 20, 1920. Serial No. 431,956.

*To all whom it may concern:*

Be it known that I, ROBERT JARDINE, a citizen of the United States of America, and resident of Chicago, county of Cook, and State of Illinois, have invented certain new and useful Improvements in Apparatus for Making Motor Valves, of which the following is a specification and which are illustrated in the accompanying drawings, forming a part thereof.

The invention relates to poppet valves and has for its object the provision of apparatus for making such valves in an improved form. While the desirability of using different materials for the heads and stems of motor valves has been recognized, it is believed that this has not been satisfactorily accomplished except in valves of expensive construction. Furthermore, the formation of valves in two or more connected parts is objectionable and the cost of machining some of the materials having the characteristics which render them especially useful for the construction of the valve heads is frequently excessive.

The present invention accordingly contemplates apparatus for casting the valve head from the selected material while the stem of the valve may be composed of other material, the latter being preferably employed in the form of a rod or bar conforming to the dimensions of the stem and the said two parts being produced as one piece by casting the valve head upon the stem when the end of the stem to which the head is applied has been heated to insure a perfect bond between the two materials. For the purpose of illustrating the invention, two forms of apparatus are illustrated in the accompanying drawings, as follows:—

Figure 1:
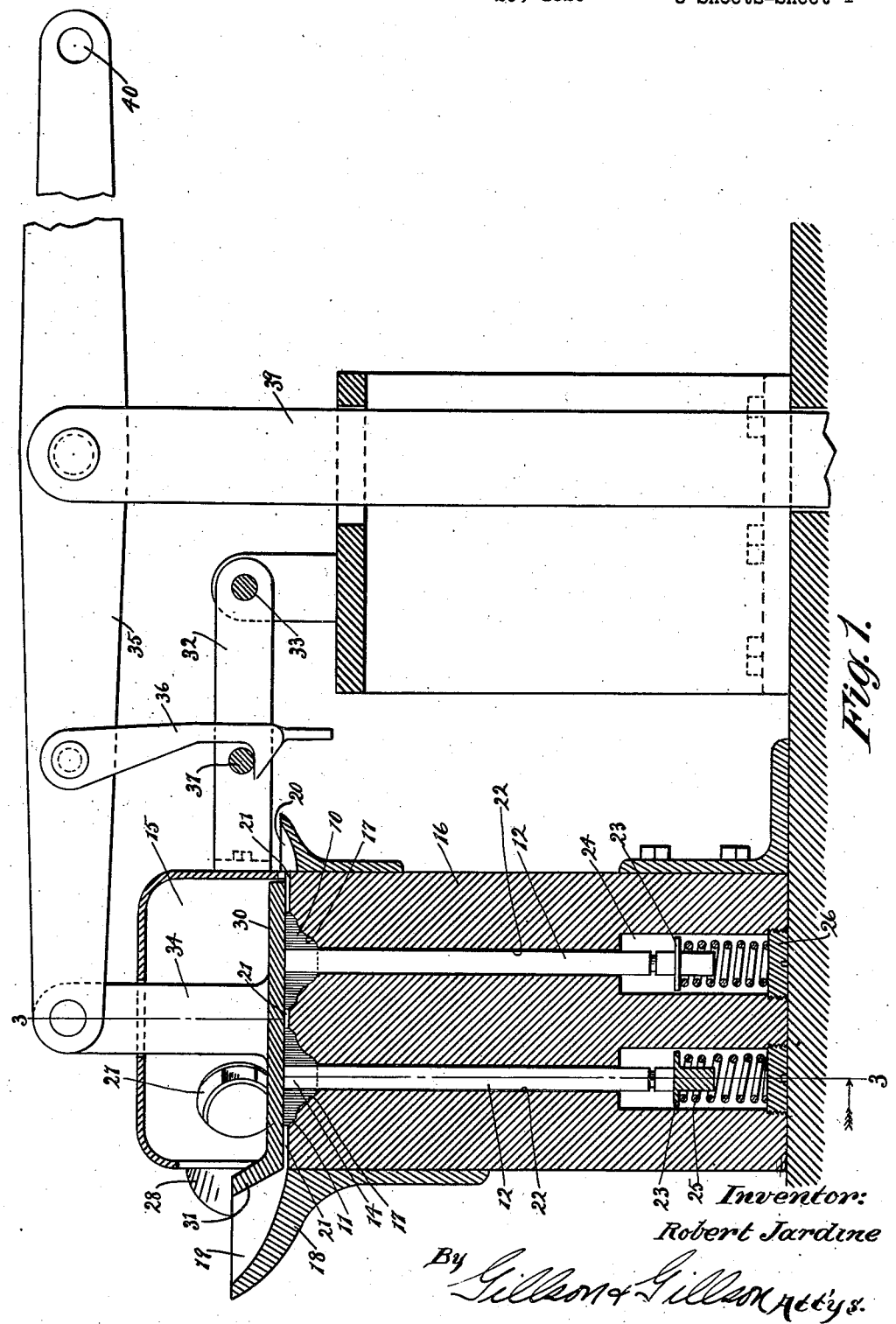
Fig. 1 is a central vertical sectional view of one form of the apparatus, some parts being shown in elevation.
Figure 2:
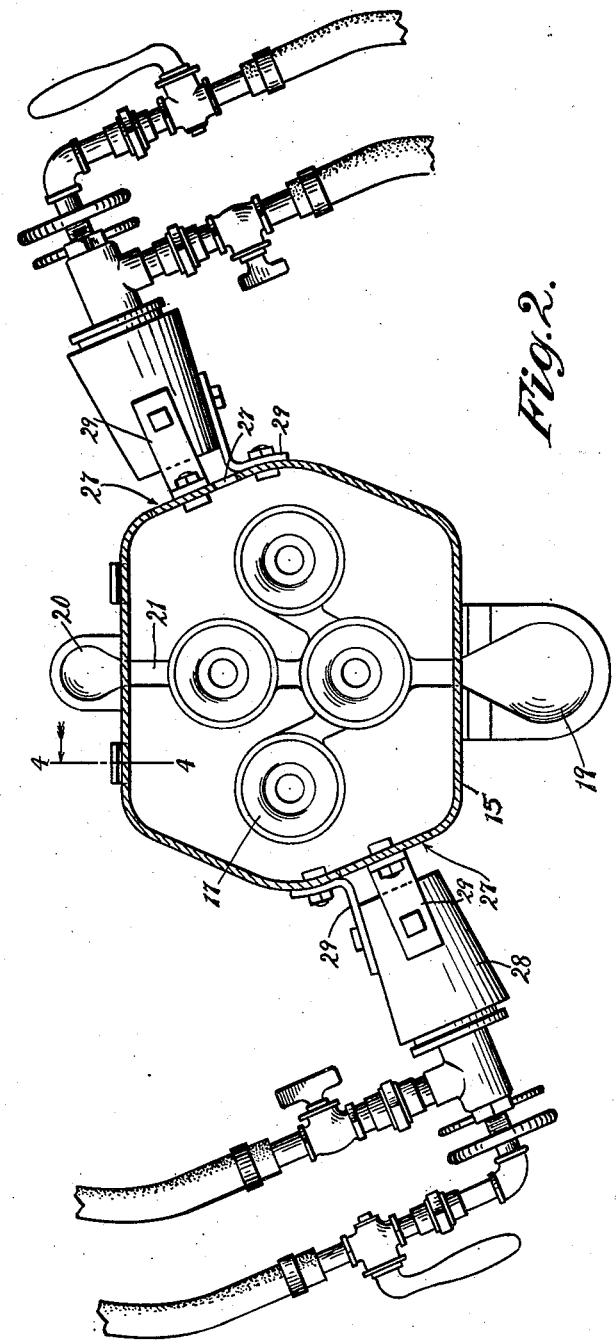
Fig. 2 is a plan view of the apparatus illustrated in Fig. 1 with some parts omitted and with the furnace walls shown in sections.
Figure 8:
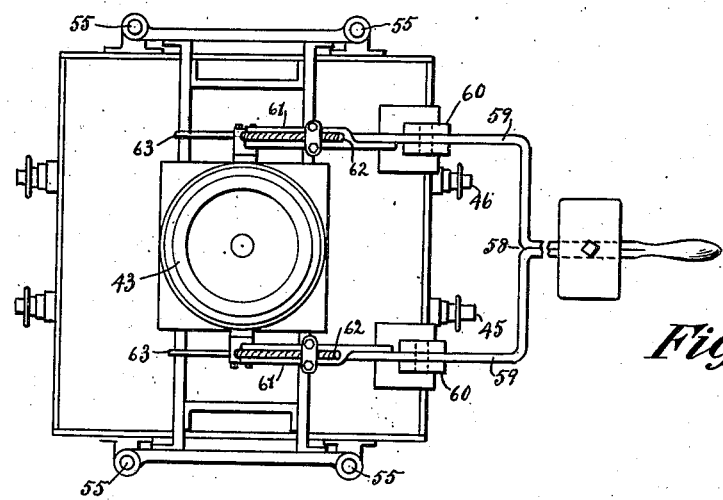
Figure 7:
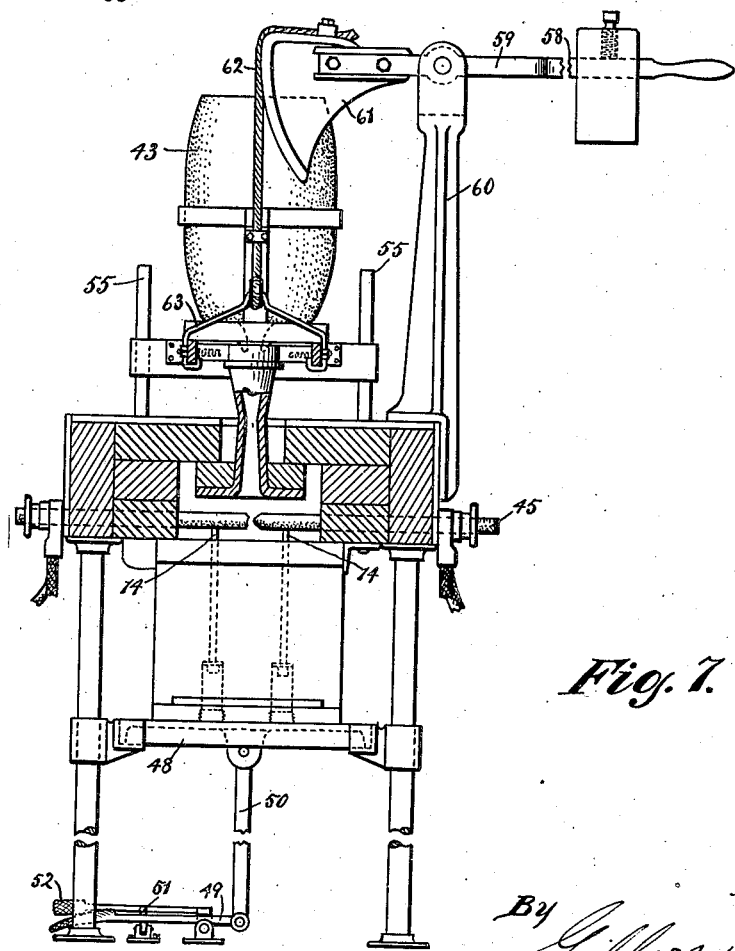

Figs. 3 and 4 are sectional views, the planes of section being respectively indicated by the line 3—3 on Fig. 1 and the line 4—4 on Fig. 2;

Fig. 5 is a perspective view of the valve, partly in section;

Figs. 6 and 7 are central vertical sectional views, taken in relatively perpendicular planes, showing another form of apparatus, some of the parts being in elevation in each of these views and the movable parts being in different positions in the two views, and Fig. 8 is a detail plan view of the apparatus illustrated in Figs. 6 and 7.

The head, as 10, of the valve (Fig. 5) is desirably composed of suitable metal for casting to substantially finished dimensions whereby machining or grinding is required only for smoothing the seat, as 11, removing such gates or fins (not shown) as would interfere with satisfactory operation of the valve in use and, in some cases, cutting the slot 41 commonly provided for receiving the tool employed for rotating the valve in seating the same. Either cast iron or such an alloy as is now used for casting high speed metal cutting tools may be employed for the head of the valve.

Apparatus embodying the invention preferably includes some form of heating appliance directly associated with the molds in which the valve heads are to be cast. In the particular form of apparatus illustrated in Figs. 1 to 4 of the drawings, a gas furnace generally designated 15 is provided for heating the ends 14 of the valve stems 12 upon which the valve heads 10 are to be cast, but other forms of furnaces may be used if desired. As shown, a mold block 16 of compressed carbon, cast iron or other suitable material, is employed and this block is formed with impressions 17 at its upper end for the casting of a plurality of valve heads 10, at one time. A flange 18 applied to the upper end of the mold block 16 provides a pouring gate 19 at one side and an overflow cup 20 at the other side, the top of the block 16 being grooved, as at 21, to connect all of the impressions 17 with the said pouring gate and over-flow cup.

The mold block 16 is further bored, as at 22, in line with each mold impression 17, to receive the rods or bars 12 which constitute the valve stems. During the heating operation the valve stems 12 are usually to be supported in the elevated position illustrated in Fig. 3 wherein their upper ends 14 are exposed above the level of the top of the mold block 16, but this will not be necessary in all cases. In any event, when the valve heads, as 10, are to be cast, the valve stems 12 are preferably supported with their upper ends flush with the top of the mold blocks 16, as in Fig. 1, and when the valve stems have been supported in the said elevated position for heating, depression of the valve stems before casting the heads, is required. To permit of this movement of the valve stems 12, the lower end of each valve stem may be seated upon a movable support, as the spring elevated plunger 23. As shown, the lower end of the mold block 16 is chambered, as at 24, to receive each of the plungers 23 and its spring 25, each chamber 24 being closed at its lower end by a screw plug 26, which constitutes an abutment for the corresponding spring.

Since the furnace 15 is employed for heating the ends 14 of the valve stems 12, while the said valve stems are supported in the position illustrated in Fig. 3, the said furnace desirably takes the general form of a chambered cover for the top of the mold block 16. When so formed the side walls of the furnace may be provided with a plurality of openings 27 through each of which a gas burner, as 28, is directed. As lifting of the furnace is necessary to permit access to the mold, each gas burner 28 is preferably secured to the side walls of the furnace about the corresponding opening, as by brackets 29. One way in which depression of the valve stems 12 from the heating position illustrated in Fig. 3 to the pouring position illustrated in Fig. 1 may be accomplished is with a movable plate 30, which bears upon the upper ends of the valve stems and constitutes the cope of the mold. As shown, the plate 30 is mounted within the chamber of the furnace 15 and is formed at one side with a flange 31 which, in the lower position of the plate, constitutes a part of the wall of the pouring gate 19.

The apparatus may be most conveniently used if provision is made for raising the furnace 15 and plate 30 together, but permitting them to be lowered separately. As shown, the furnace 15 is carried by a pair of hinge brackets 32 which are pivotally connected to a fixed support at 33. The plate 30 on the other hand is formed with a pair of uprights 34 which extend through the top of the furnace 15 and are there connected with an operating lever 35. In order that the operating lever 35 may serve for lifting both the plate 30 and the furnace 15 it is equipped with a hooked arm 36 for engagement with a pin 37 carried by the hinge brackets 32 of the furnace. When it is desired to lower the plate 30, the hook 36 is merely released from engagement with the pin 37.

Any desired arrangement may be employed for swinging the operating lever 35. That illustrated includes a foot pedal 38 and a link 39 extending from the foot pedal and connected to the lever 35 in front of the place, as 40, where the lever is to be fulcrumed. When this arrangement is employed the valve stems 12 are brought to the pouring position against the effort of the springs 25, by pressure on the foot pedal 38. Since the hook 36 will become engaged with the pin 37 when the plate 30 has been lowered, both the plate 30 and furnace 15 will be lifted when the pressure applied to the foot pedal 38 has been released. Under these circumstances the molds are, of course, poured while the foot pedal 38 is being held in depressed position.

In the form of apparatus illustrated in Figs. 6, 7 and 8, an electric furnace, generally designated 42, is employed for heating the end portions 14 of the valve stems 12 and a crucible, as 43, for containing the molten metal from which the valve heads 10 are cast is centrally mounted over the furnace. In this instance the furnace 42 is stationarily mounted, as upon standards 44, and the particular form of heating apparatus shown comprises two sets of carbon electrodes, conventionally represented at 45 and 46, which extend into the furnace chamber through the side walls of the same.

When the furnace 42 is stationary, as shown, the mold block, as 47, is preferably mounted for vertical movement, as by resting upon a table 48 which runs upon the standards 44. The mold block 47, if desired, may be constructed like the mold block 16 shown in Figs. 1 and 3, both with respect to being bored, as at 22, for receiving the valve stems 12 and the provision of mold impressions 17 in its upper end and spring elevated plungers 23 on which the valve stems 12 are supported. A pivoted foot lever 49 having one end connected to the table 48 as by a link 50 serves for raising the mold block 47 and when in elevated position the top of the mold block constitutes the floor of the chamber of the furnace 42. As shown, a latch 51, controlled by laterally movable lever 52 which extends along side of the lever 49 in position to be engaged by the foot of the operator for releasing the said latch, serves for locking the lever 49 against movement in one direction and thus holding the mold block 47 in the said elevated position.

The bottom of the crucible 43 is centrally provided with a pouring gate 53 controlled by a plunger 54 and the crucible is lowered over the furnace for pouring. For this purpose the crucible 43 is held in a frame 54ª having vertical movement upon standards 55 which rise from the furnace 42 at opposite sides of the same. The frame 54ª also carries a pouring spout 56. This spout extends downwardly through the furnace roof in line with the pouring gate 53 of the crucible 43 and has a flanged lower end 57 which engages with the upper ends of the valve stems 12 for depressing the same when the frame 54ª is lowered as in Fig. 6 and also constitutes the cope of the corresponding mold impressions 17.

The weighted hand lever generally designated 58 may be employed for raising and lowering the frame 54ª. As shown, this hand lever is bifurcated and comprises the two arms 59 each of which is pivoted upon a bracket 60 rising from the furnace 42 at one side of the same. Likewise, each arm 59 is provided with a segment member 61 at its free end to which a cable 62 is attached and the cables 62 are connected at their lower ends with bails 63 applied to the frame 54ª, one at each side of the crucible 43.

When carbon electrodes of the form shown are used, the chamber of the furnace is highly heated by the electric arcs drawn between the electrodes 45 and 46 of the two sets. After the mold block 47 with the stem rods 12 mounted therein has been raised against the underside of the furnace, as in Fig. 7, the upper end portions 14 of the rods are exposed to the heat of the furnace until the pouring spout 56 is depressed by lowering the frame 54ª and the valve heads are poured.

The improved valve and the method by which the same is made are not claimed herein for the reason that such claims are presented in a separate application.

I claim as my invention:

1. Apparatus for casting motor valves and the like having cast metal heads and wrought metal stems comprising, in combination, a mold for the valve head having a print for receiving the valve stem to support the same within the mold, and means for heating the valve stem while so supported in advance of pouring the mold.

2. Apparatus for casting motor valves and the like having cast metal heads and wrought metal stems comprising, in combination, a normally open mold for the valve head having a print for receiving the valve stem to support the same within the mold, a chambered cover for the mold, and means for applying heat within the chamber of the cover in advance of pouring the mold.

3. Apparatus for casting motor valves and the like having cast metal heads and wrought metal stems comprising, in combination, a mold for the valve head having a print for receiving the valve stem to support the same within the mold, means for heating the valve stem while so supported, and means for moving the valve stem longitudinally in the mold.

4. Apparatus for casting motor valves and the like having cast metal heads and wrought metal stems comprising, in combination, a normally open mold for the valve head having a print for receiving the valve stem to support the same within the mold, a chambered cover for the mold, a cope movable toward and away from the mold within the chamber of the said cover and means for applying heat within the chamber of cover under the said cope when separated from the mold.

5. Apparatus for casting motor valves and the like, having cast metal heads and wrought metal stems comprising, in combination, a mold block having a mold impression for the valve head at one side of the block and a print for the valve stem extending through the block in line with the said mold impression, a spring pressed plunger acting in line with the said print at the remote end thereof from the mold impression and a cope plate coacting with the side of the block having the said mold impression.

6. Apparatus for casting motor valves and the like having cast metal heads and wrought metal stems comprising, in combination, a furnace having an opening at one side, a mold block fitting the furnace opening and having a mold impression for the valve head upon the side of the block adjacent the furnace and a print for the valve stem extending into the block, and a cope plate coacting with the said mold block movably mounted within the furnace.

7. Apparatus for casting motor valves and the like having cast metal heads and wrought metal stems comprising, in combination, a furnace having an opening at one side, a mold block fitting the furnace opening and having a mold impression for the valve head upon the side of the block adjacent the furnace and a print for the valve stem extending into the block, a spring pressed plunger acting in line with the said print at the remote end thereof from the mold impression and a cope plate coacting with the said mold block movably mounted within the furnace.

ROBERT JARDINE.